(12) United States Patent
Liu et al.

(10) Patent No.: US 11,028,820 B2
(45) Date of Patent: Jun. 8, 2021

(54) TIDAL CURRENT GENERATING UNIT

(71) Applicant: HangZhou JiangHe Hydro-Electrical Science&Technology Co., Ltd., Zhejiang (CN)

(72) Inventors: Changlu Liu, Zhejiang (CN); Liwei Chen, Zhejiang (CN); Zhengming Zhou, Zhejiang (CN); Jianfeng Yu, Zhejiang (CN); Yinhua Chen, Zhejiang (CN); Shanguo Peng, Zhejiang (CN); Junsheng Wei, Zhejiang (CN); Xue Sun, Zhejiang (CN); Chunming Zhao, Zhejiang (CN); Yongzhen Cheng, Zhejiang (CN); Fang Wang, Zhejiang (CN)

(73) Assignee: HangZhou JiangHe Hydro-Electrical Science & Technolo, Hangzhou (CN)

( * ) Notice: Subject to any disclaimer, the term of this patent is extended or adjusted under 35 U.S.C. 154(b) by 0 days.

(21) Appl. No.: 16/688,330

(22) Filed: Nov. 19, 2019

(65) Prior Publication Data
US 2021/0108607 A1   Apr. 15, 2021

(30) Foreign Application Priority Data

Oct. 10, 2019   (CN) .......................... 201910958281.4

(51) Int. Cl.
*F03B 13/26*      (2006.01)
*F03B 3/12*       (2006.01)

(52) U.S. Cl.
CPC ................ *F03B 13/26* (2013.01); *F03B 3/12* (2013.01); *F05B 2220/706* (2013.01)

(58) Field of Classification Search
CPC ....... F03B 13/26; F03B 3/12; F05B 2220/706
USPC ........................................ 290/42, 43, 53, 54
See application file for complete search history.

(56) References Cited

U.S. PATENT DOCUMENTS

| 2,080,955 | A | * | 5/1937 | Watkins | ................ F03D 7/0224 |
| | | | | | 290/44 |
| 3,582,023 | A | * | 6/1971 | Rosta | ...................... B64C 27/20 |
| | | | | | 244/23 C |
| 3,583,828 | A | * | 6/1971 | White | ................... B64C 11/303 |
| | | | | | 416/38 |

(Continued)

FOREIGN PATENT DOCUMENTS

| CN | 102230440 A | 11/2011 |
| CN | 203978705 U | 12/2014 |

(Continued)

*Primary Examiner* — Sean Gugger

(57) ABSTRACT

A tidal current generating unit, including a turbine, a hub, a generator, a bearing set and a fixed flange. The turbine is connected to the rotor of the generator through the hub, and the rotor is rotatably mounted on the outer circumference of the stator of the generator via the bearing set, and the turbine drives the rotating component to rotate to generate electricity. A density of a blade is much smaller than a density of the seawater, such that the blade has a sufficient buoyancy that offsets the gravity of the rotating component in seawater, and the load of the bearing sets is reduced. The blade is a backswept blade and the hydrodynamic central axis of the blade is inclined from a flange central axis of the blade at a first angle, and the blade is able to automatically change the pitch without relying on an external force.

9 Claims, 8 Drawing Sheets

(56) References Cited

U.S. PATENT DOCUMENTS

| | | | | |
|---|---|---|---|---|
| 5,005,357 | A * | 4/1991 | Fox | F03B 13/142 60/398 |
| 5,286,166 | A * | 2/1994 | Steward | B63H 3/008 416/136 |
| 5,599,168 | A * | 2/1997 | Lund | F03D 7/0236 416/136 |
| 6,761,533 | B2 * | 7/2004 | Favaro | F03D 7/0224 416/51 |
| 2008/0226450 | A1 * | 9/2008 | Clarke | F03B 3/126 416/124 |
| 2009/0004008 | A1 * | 1/2009 | Richards | F01D 21/14 416/145 |
| 2010/0001528 | A1 * | 1/2010 | Kliewer | F03B 17/063 290/52 |
| 2010/0129215 | A1 * | 5/2010 | Preus | F03D 7/041 416/41 |
| 2010/0226772 | A1 * | 9/2010 | Deering | F03D 7/0276 416/1 |
| 2010/0295309 | A1 * | 11/2010 | Holstein | F03B 13/264 290/52 |
| 2011/0272945 | A1 * | 11/2011 | Ortiz | F03B 3/14 290/53 |
| 2012/0321466 | A1 * | 12/2012 | Chir | F03B 3/14 416/128 |
| 2013/0026761 | A1 * | 1/2013 | Rajadhyaksha | F03B 17/062 290/54 |
| 2013/0045080 | A1 * | 2/2013 | Kirke | F03D 3/068 415/53.1 |
| 2013/0071240 | A1 * | 3/2013 | Chir | F03B 13/268 415/220 |
| 2013/0277980 | A1 * | 10/2013 | Kiyose | H02K 7/1823 290/54 |
| 2013/0302169 | A1 * | 11/2013 | Hennes | F03D 1/0658 416/170 R |
| 2014/0077772 | A1 * | 3/2014 | Chir | F03B 13/268 322/15 |
| 2014/0284932 | A1 * | 9/2014 | Sharkh | F03D 9/25 290/54 |
| 2015/0147172 | A1 * | 5/2015 | Chacon | F03D 7/0224 416/1 |
| 2015/0284069 | A1 * | 10/2015 | Fabre | B64C 11/385 416/147 |
| 2017/0167465 | A1 * | 6/2017 | Shintake | F03B 13/22 |
| 2018/0230965 | A1 * | 8/2018 | Ejlersen | F03D 7/0224 |
| 2020/0056584 | A1 * | 2/2020 | Sia | F03D 1/00 |
| 2020/0132041 | A1 * | 4/2020 | Chen | F03B 13/268 |

FOREIGN PATENT DOCUMENTS

| | | |
|---|---|---|
| CN | 204783420 U | 11/2015 |
| CN | 108468614 A | 8/2018 |

* cited by examiner

TIDAL CURRENT GENERATING UNIT

CROSS-REFERENCE TO RELATED APPLICATIONS

This application claims the benefit of priority from Chinese Patent Application No. 201910958281.4, filed on Oct. 10, 2019. The content of the aforementioned application, including any intervening amendments thereto, is incorporated herein by reference in its entirety.

TECHNICAL FIELD

The application relates to ocean tidal energy, fluid machinery and generator designing, more particularly, to a tidal current generating device.

BACKGROUND OF THE INVENTION

Various tidal current generating units such as horizontal axis tidal current generating units and vertical axis tidal current generating units, etc. are formed during the tidal energy exploitation all over the world. The flows and ebbs of the sea, as known to all, flow in both directions, but for most tidal current generating units: a fixed pitch method adopted by the turbine can only generate electricity using the tidal energy in one direction rather than in both directions, and the overload of tidal current generating units cannot be controlled during the spring tide, and thus the safe and steady operation cannot be guaranteed; or the fixed pitch method adopted by the turbine is able to generate electricity using the tidal energy in both directions but with a low tidal energy utilization, and the overload of tidal current generating units still cannot be controlled during the spring tide and thus the safe and steady operation still cannot be guaranteed; and some tidal current generating units adopt hydraulic or electric pitch adjusting method, which is based on the turbine technology of the hydroelectric power, but the reliability of such tidal current generating units in the ocean environment as well as the tidal energy utilization in both directions is still low. In addition, an accelerator is adopted by most tidal current generating units, through which the turbine drives the generator, such that the rotational speed of the generators is improved, the size of the generators is reduced and the design and manufacture of the generators is simplified, however, the adoption of the accelerator increases the failure rate, maintenance difficulty and power loss, and affects the tidal energy utilization. Also, the unit capacity of the tidal current generating units has been developed to the megawatt level, but due to the sealed generator room, the sealing structure and heat dissipation of the generators have grown into technical problems.

SUMMARY OF THE INVENTION

Therefore, there is a need for a tidal current generating unit that is able to automatically change the pitch under the forward or reverse tidal currents without relying on an external force such as a hydraulic pressure or electricity and generate electricity by directly driving the generator.

The present invention provides a tidal current generating unit to achieve the above purpose, comprising: a turbine, a hub, a generator, a bearing set and a fixed flange; the generator comprises a stator and a rotor;

the turbine is connected to the rotor of the generator by the hub; the rotor is rotatably mounted on an outer circumference of the stator of the generator via the bearing set; the stator of the generator is fixedly connected to the fixed flange; a rotating component comprises the hub and the rotor; and the turbine drives the rotating component to rotate to generate electricity; and the turbine comprises a blade, and a density of the blade is much smaller than a density of seawater, such that the blade has sufficient buoyancy that offsets gravity of the rotating component in the seawater, and a load of the bearing set is reduced.

In some embodiments, the blade is a backswept blade, and a hydrodynamic central axis of the blade is inclined from a flange central axis of the blade at a first angle; and the blade is hollow and is filled with a light filler inside.

In some embodiments, when a flow rate of a tidal current is higher than a threshold value to cause an overload of the generator, a pitch is automatically adjusted by the turbine through a mechanical structure, such that a pitch angle of the blade is adjusted to limit output power of the generator.

In some embodiments, the turbine further comprises a blade stem, a blade stem bearing, a pitch limiter, a forward pitch regulator and a reverse pitch regulator; a root of the blade is fixedly connected to the blade stem; the blade stem is radially and rotatably mounted to the hub via the blade stem bearing; and a rear end of the blade stem is connected to the pitch limiter;

the pitch limiter comprises a first limiting edge and second limiting edge which are protruding and surrounds the rear end of the blade stem;

under an action of a forward tidal current, the first limiting edge cooperates with the forward pitch regulator to limit the pitch angle of the blade to a corresponding angle; and under an action of a reverse tidal current, the second limiting edge cooperates with the reverse pitch regulator to limit the pitch angle of the blade to a corresponding angle.

In some embodiments, the forward pitch regulator comprises a forward baffle, a forward spring and a forward pin; a side of one end of the forward baffle abuts one end of the forward spring; a middle of the other end of the forward baffle is rotatably mounted to the hub by the forward pin, and the forward baffle is rotatable around the forward pin; and the other end of the forward spring abuts the hub; and the reverse pitch regulator comprises a reverse baffle, a reverse spring and a reverse pin; a side of one end of the reverse baffle abuts one end of the reverse spring; a middle of the other end of the reverse baffle is rotatably mounted to the hub by the reverse pin, and the reverse baffle is rotatable around the reverse pin; and the other end of the reverse spring abuts the hub.

In some embodiments, a fixed dome is fixed at a front of the stator, and a rotatable draft tube is provided on an outside of the rotor, and rotates with the turbine and the rotor;

the bearing set comprises a reverse thrust bearing, a forward thrust bearing, a front guide bearing and a rear guide bearing; and the reverse thrust bearing is mounted between a front end of a central shaft of the stator and a front bracket of the rotor, and the forward thrust bearing is mounted between a rear end of the central shaft of the stator and a rear bracket; and an axial round hole is provided at a center of rear bracket and mounted with the rear guide bearing.

In some embodiments, a blade stem hole is radially distributed on the hub, and the blade stem is rotatably mounted in the blade stem hole via the blade stem bearing, and the blade stem is rotatable around a flange central axis of the blade in the blade stem hole; an axial round hole is provided on a center of the hub and mounted with the front guide bearing.

In some embodiments, the generator is of an open structure without a sealed compartment; and a sealing layer is respectively provided on electrical surfaces of the stator and rotor.

In some embodiments, an outer ring of the reverse thrust bearing is provided with a sediment control ring to prevent sediment from entering the reverse thrust bearing; and an outer ring of the forward thrust bearing is provided with the sediment control ring to prevent the sediment from entering the forward thrust bearing.

In some embodiments, a sediment discharge hole is provided on both ends of an outer wall of the rotor, so that the sediment is discharged outside the generator under a centrifugal force when the rotor rotates.

Beneficial effects of the present invention are as follows:

The tidal current generating unit comprises the turbine, the hub, the generator, the bearing set and the fixed flange; the generator comprises a stator and a rotor; the turbine is connected to the rotor of the generator by the hub; the rotor is rotatably mounted on the outer circumference of the stator of the generator via the bearing set; the stator is fixedly connected to the fixed flange; a rotating component comprises the hub and the rotor; and the turbine drives the rotating component to rotate to generate electricity; and the turbine comprises a blade, and a density of the blade is much smaller than a density of the seawater, such that the blade has sufficient buoyancy that offsets the gravity of the rotating component in the seawater, which greatly reduces a load of the bearing set; and the forward or reverse tidal energy can be captured by the tidal current generating unit by automatically changing the pitch without relying on an external force such as a hydraulic or electric source, and the electricity is directly generated by driving the generator.

BRIEF DESCRIPTION OF THE DRAWINGS

In order to more clearly illustrate the embodiments of the present invention or the technical solutions in the prior art, the drawings of the embodiments will be briefly described below. Obviously, the drawings in the following description are only a part of the embodiments of the present invention, and other drawings can be obtained according to the structures shown in the drawings without any creative work by the skilled in the art.

DETAILED DESCRIPTION OF EMBODIMENTS

The technical solutions of the embodiments of the present invention will be clearly and completely described in the following with reference to the drawings of the embodiments of the present invention. Obviously, the described embodiments are only a part of the embodiments of the present invention. All other embodiments obtained by the skilled in the art based on the embodiments of the present invention without creative works fall within the scope of the present invention.

It should be noted that terms such as "up", "down", "left", "right", "front", "rear" in the embodiments of the present invention are only used to explain the relative position and movement, etc. and such terms will change with the change of the specific position.

In addition, terms "first", "second", and the like in the present invention are used for description only, and are not intended to indicate or imply their relative importance or the number of technical features, which explicitly or implicitly indicates that one or more features defined by "first" or "second" may be included in the present invention. In addition, the technical solutions of various embodiments may be combined to form other embodiments which are considered to fall within the claimed scope.

In the present invention, unless specified, terms "connect", "fix" and the like should be understood broadly. For example, "fix" may result in a fixed connection, a detachable connection, or an integrated configuration of elements. The elements may be connected mechanically or electrically; or directly connected or indirectly connected through an intermediate medium. Alternatively, two elements may be in communication or interact with each other unless specified. For the skilled in the art, the specific meanings of the above terms in the present invention can be understood according to specific conditions.

Figure 1:
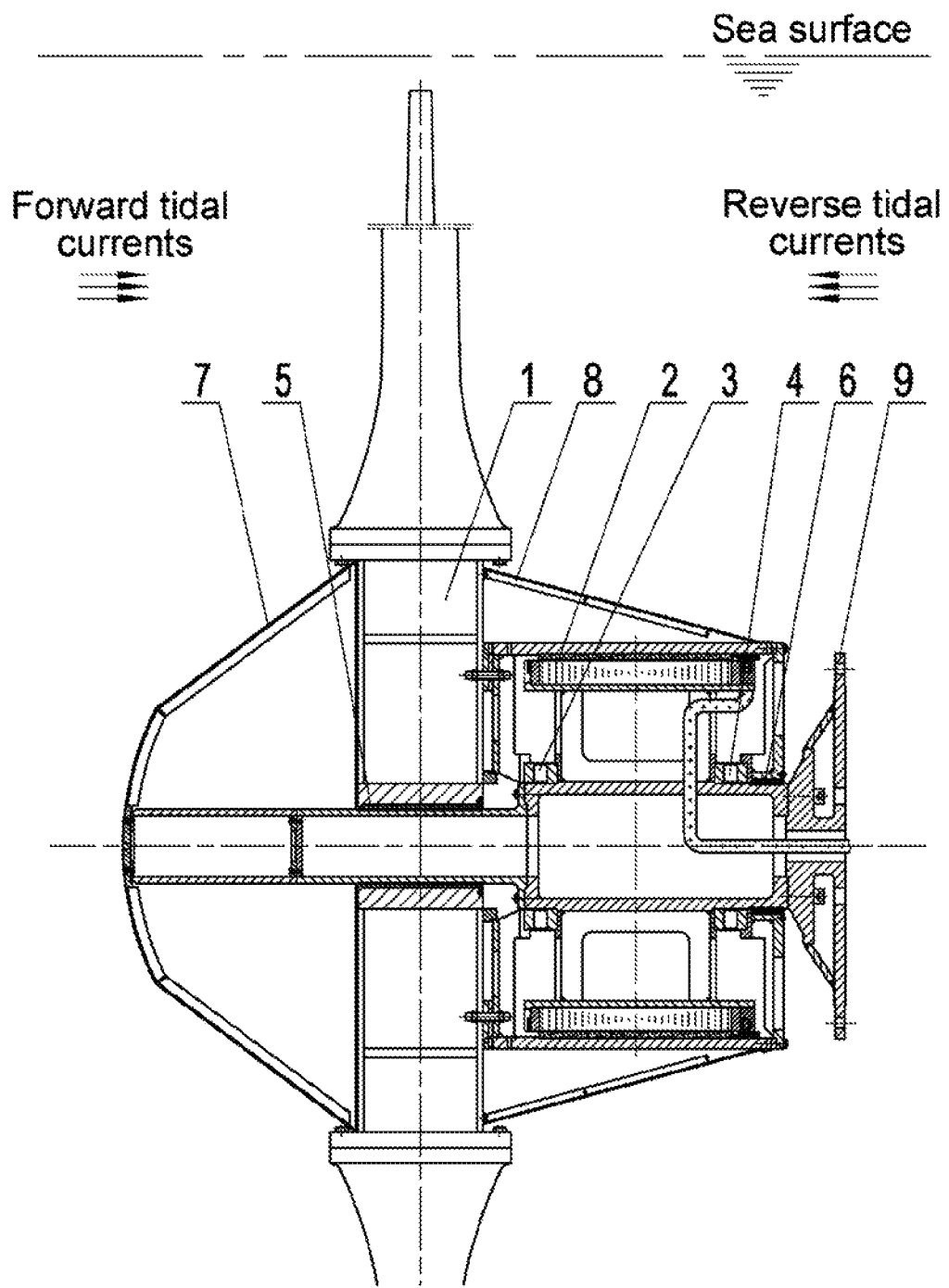
FIG. 1 is a schematic diagram of a tidal current generating unit of the present invention.
Figure 3:
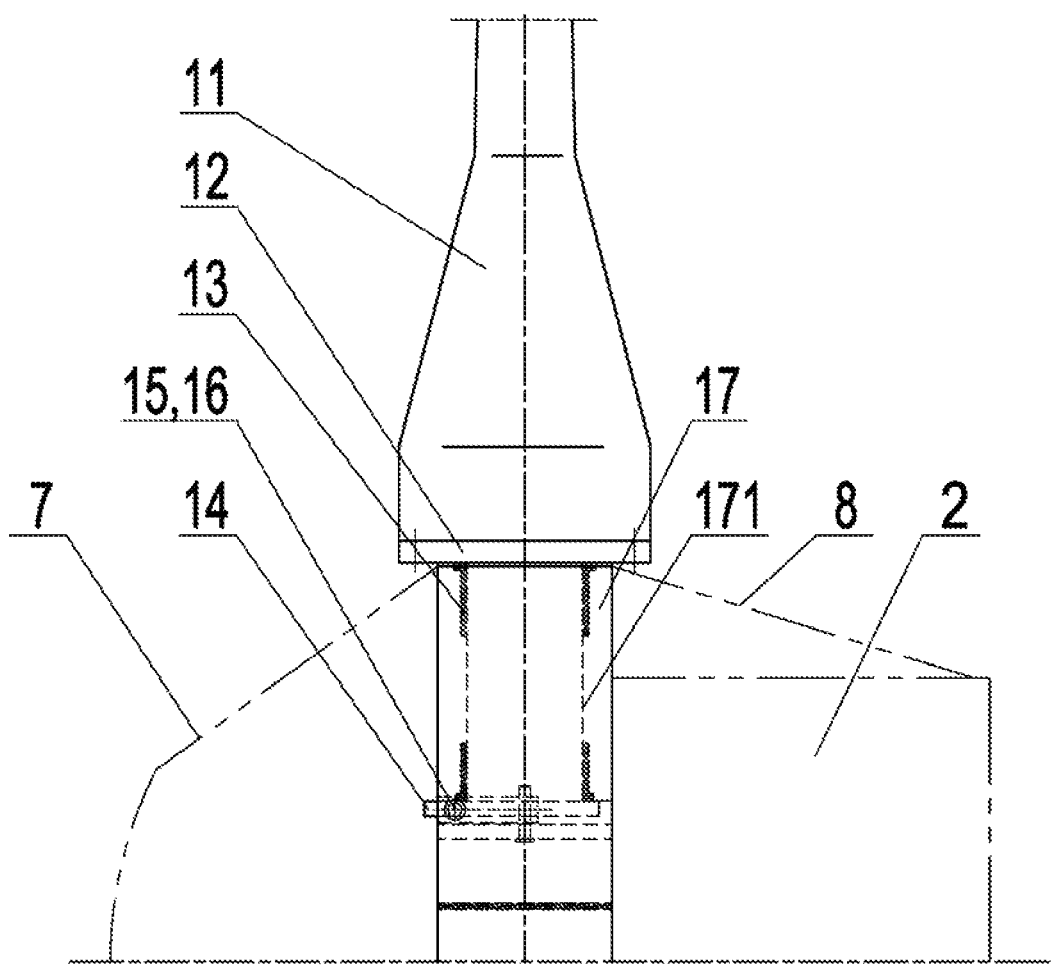
FIG. 3 is a side view of the turbine of the tidal current generating unit of the present invention.
Figure 10:
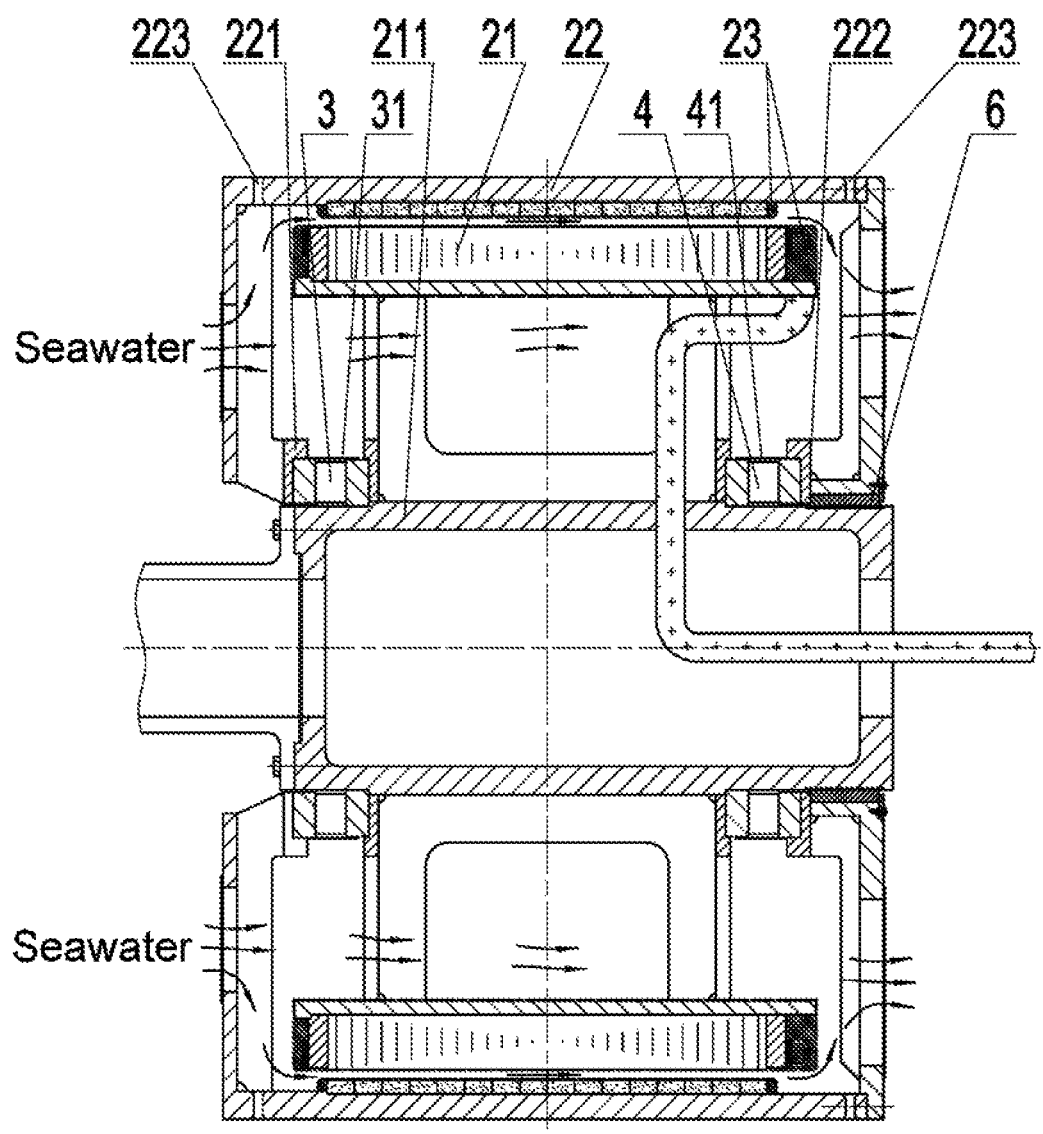
FIG. 10 is a front view of a generator of the tidal current generating unit of the present invention.

As shown in FIGS. 1, 3 and 10, the tidal current generating unit of the present invention comprises a turbine 1, a generator 2, a bearing set (comprising a reverse thrust bearing 3, a forward thrust bearing 4, a front guide bearing 5, and a rear guide bearing 6), a fixed dome 7, a rotatable draft tube 8 and a fixed flange 9; the turbine 1 is directly connected to a rotor 22 of the generator 2 by the hub 17, and the rotor 22 is rotatably mounted on the outer circumference of a stator 21 of the generator 2 via the bearing set (comprising the reverse thrust bearing 3, a forward thrust bearing 4, a front guide bearing 5, and a rear guide bearing 6), and the stator 21 is fixedly connected to the fixed flange 9 which fixes the tidal current generating unit 100 to an external carrier platform. A fixed dome 7 is fixedly mounted at the front end of the stator 21 to reduce the flow resistance, and a rotatable draft tube 8 is fixedly mounted on the outer circumference of the rotor 22 to reduce the flow resistance, and the rotatable draft tube 8 rotates with the turbine 1 and the rotor 22.

Figure 2:
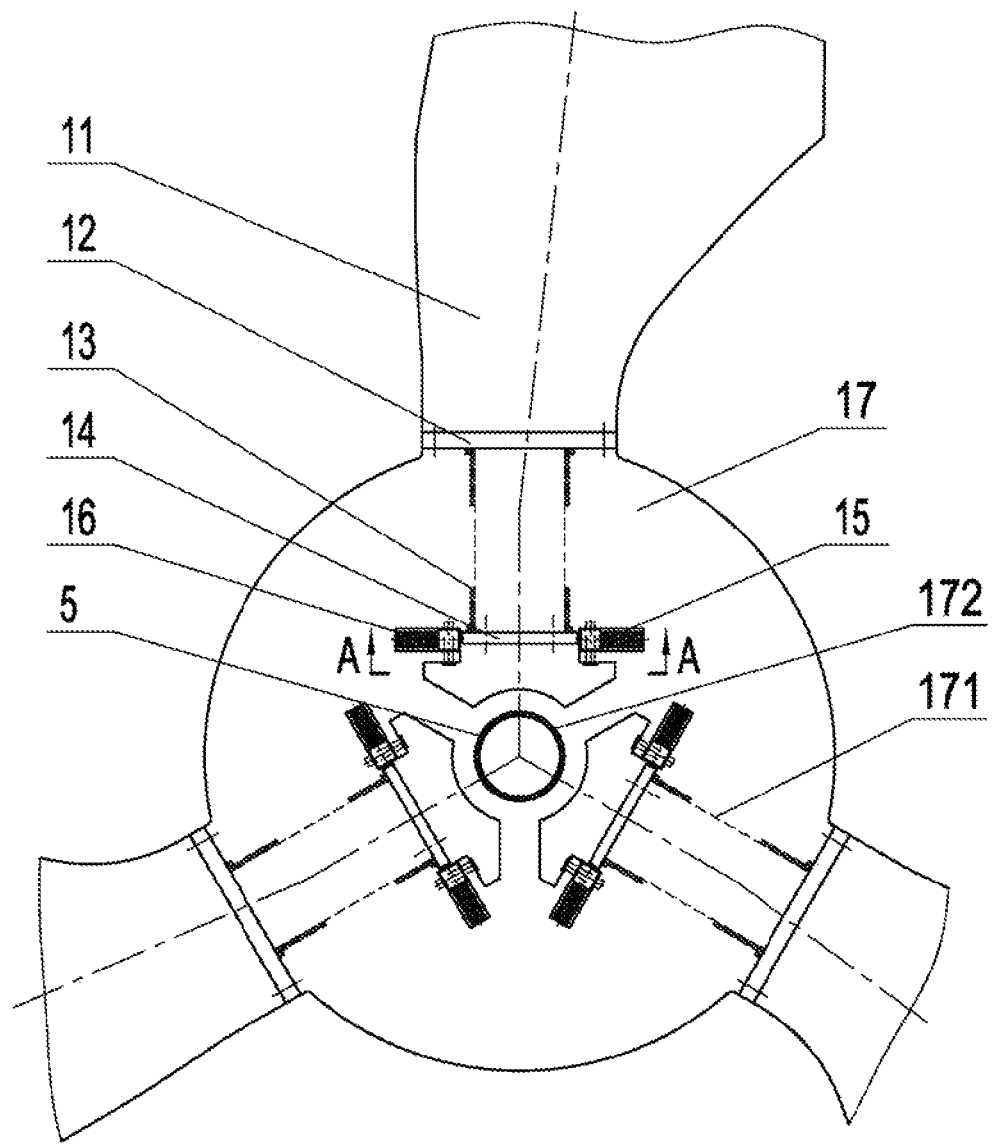
FIG. 2 is a front view of a turbine of the tidal current generating unit of the present invention.

As shown in FIGS. 2-3, the turbine 1 comprises a blade 11, a blade stem 12, a blade stem bearing 13, a pitch limiter 14, a forward pitch regulator 15, a reverse pitch regulator 16 and a hub 17; a root of the blade 11 is fixedly connected to the blade stem 12; a blade stem hole 171 is radially distributed on the hub 17, and the blade stem 12 is rotatably mounted in the blade stem hole 171 via the blade stem bearing 13 and is rotatable around the flange central axis of the blade 11 in the blade stem hole 171; a rear end of the blade stem 12 is connected to the pitch limiter 14; and an axial round hole 172 is provided on the center of the hub 17 and mounted with the front guide bearing 5.

Figure 4:
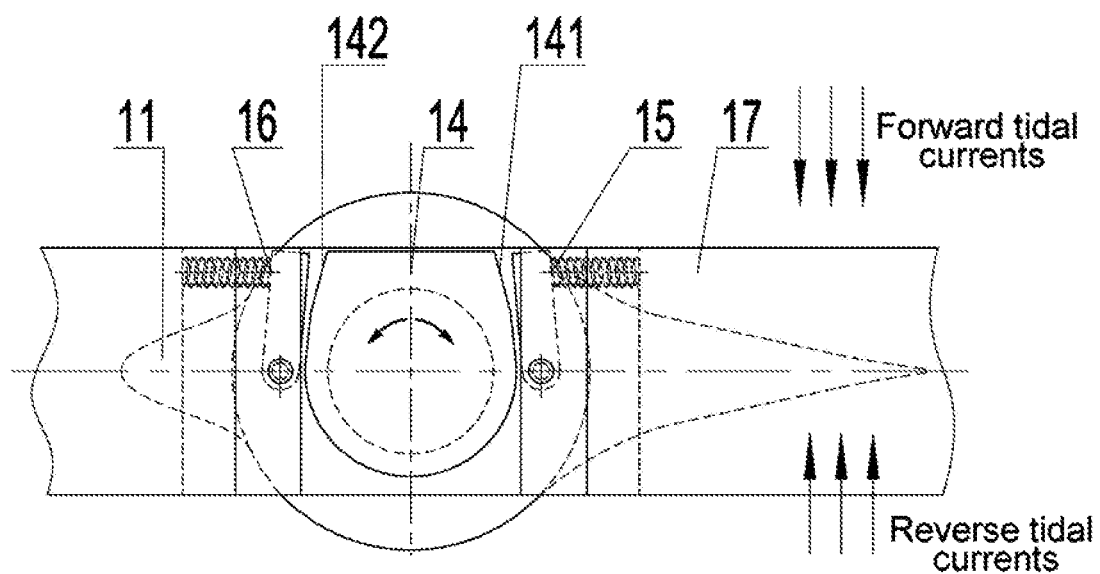
FIG. 4 is a sectional view of FIG. 2 along A-A direction.

As shown in FIG. 4, the pitch limiter 14 comprises a first limiting edge 141 and a second limiting edge 142 which are protruding. The first and second limiting edges 141, 142 surrounds the end of the blade stem 12. Under an action of a forward tidal current, the first limiting edge 141 cooperates with the forward pitch regulator 15 to limit the pitch angle of the blade 11 to a corresponding angle; under an action of a reverse tidal current, the second limiting edge 142 cooperates with the reverse pitch regulator 16 to limit the pitch angle of the blade 11 to a corresponding angle.

Figure 5:
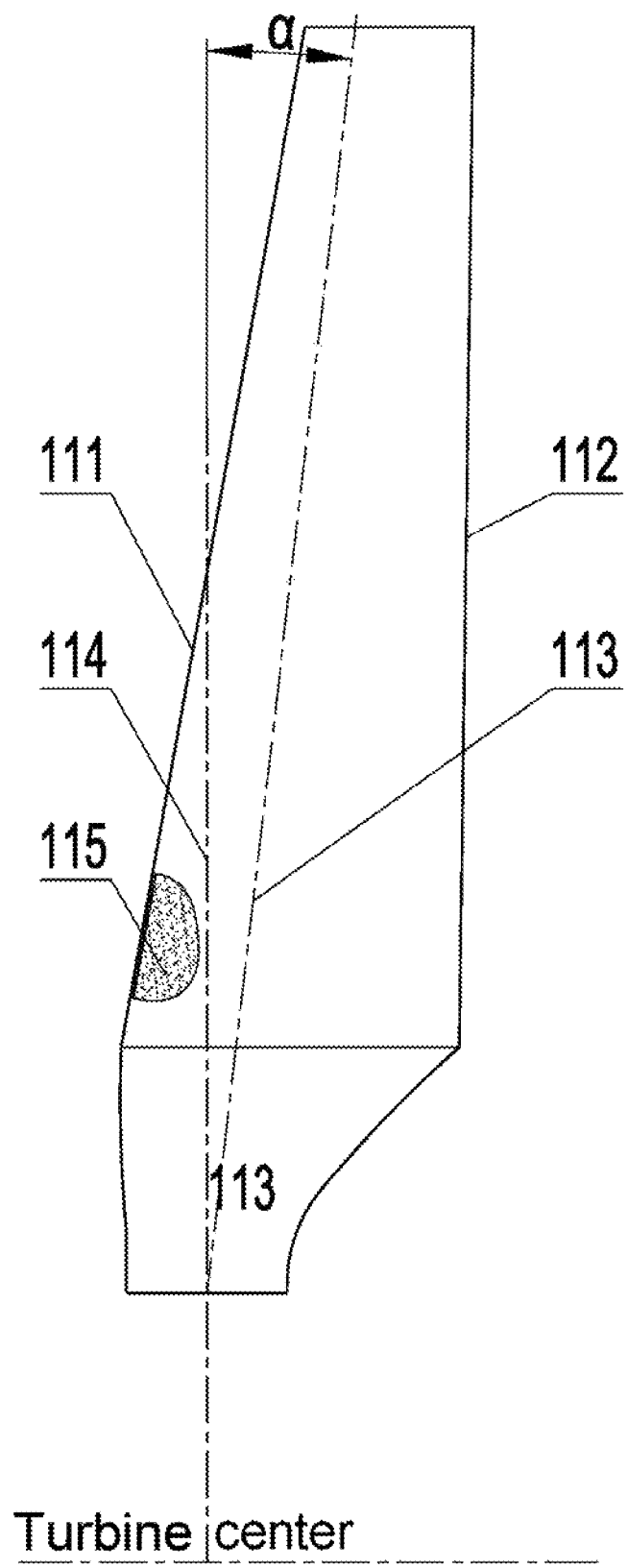
FIG. 5 is a schematic diagram of a backswept blade of the tidal current generating unit of the present invention.

As shown in FIG. 5, the blade 11 is a backswept blade and a hydrodynamic central axis 113 of the blade is inclined from a front edge 111 to a rear edge 112 by a first angle α from a flange central axis 114 of the blade 11. The blade 11 is hollow and filled with a light filler 115 inside, such that the blade 11 has large buoyancy in the seawater due to the density of the blade 11 is much smaller than the density of the seawater to offset the gravity of the rotating component such as the hub 17, the rotor 22, etc., and thus the load of the front guide bearing 5 and a rear guide bearing 6 is greatly reduced. In other embodiments, the blade 11 can be designed to have sufficient rather than excessive buoyancy in the seawater to offset the gravity of the rotating component.

Figure 6:
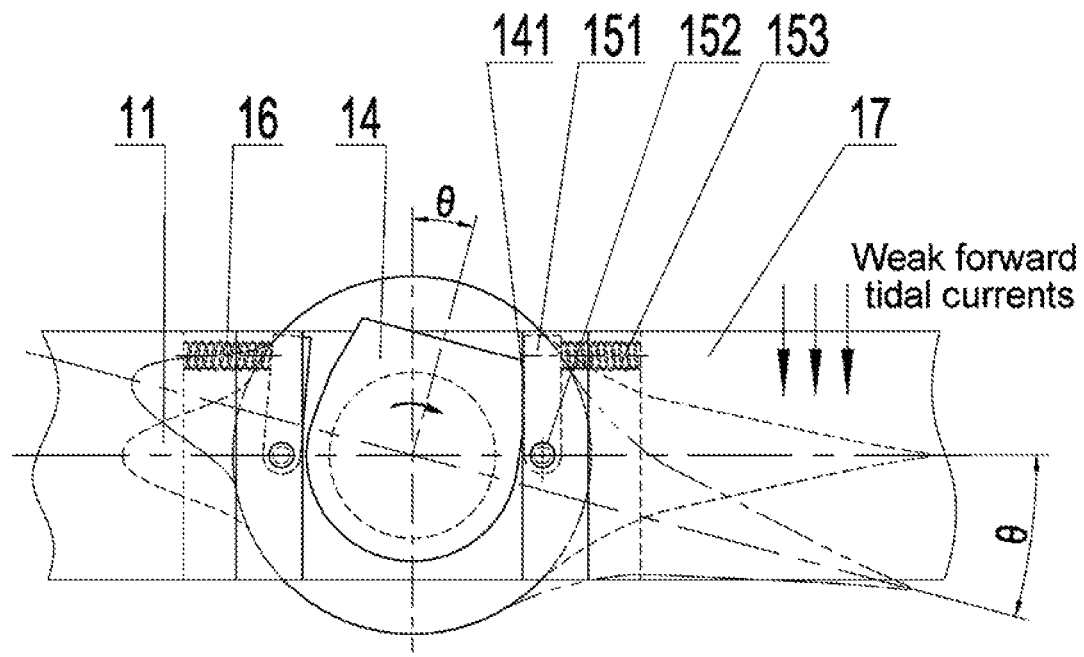
FIG. 6 is a schematic diagram showing a blade pitch is changed to limit the blade of the tidal current generating unit of the present invention under a weak forward stream.

As shown in FIG. 6, the forward pitch regulator 15 comprises a forward baffle 151, a forward spring 153 and a forward pin 152. The side of one end of the forward baffle 151 is connected to/abuts one end of the forward spring 153, and the middle of the other end of the forward baffle 151 is rotatably mounted to the hub 17 by the forward pin 152; the forward baffle 151 is rotatable around the forward pin 152; and the other end of the forward spring 153 is connected to/abuts the hub 17.

As shown in FIGS. 5-6, when the blade 11 is pushed by weak forward tidal currents, the hydraulic torque obtained at the rear edge 112 of the blade corresponding to the flange central axis 114 is greater than the hydraulic torque obtained at the front edge 111 of the blade corresponding to the flange central axis 114 due to the backswept blade. The blade 11, blade stem 12 and pitch limiter 14 are clockwise rotatable around the flange central axis 114 of the blade; the first limiting edge 141 is in contact with the forward baffle 151 so that a pressure is generated and transferred to the forward spring 153, and the forward spring 153 is compressed and shortened; the forward baffle 151 is clockwise rotatable around the forward pin 152; and the pressure is eventually balanced by the reaction force of the forward spring 153, so that the pitch angle of the blade 11 is changed and maintained at a forward angle θ. The tidal energy captured by the turbine 1 rotates counterclockwise around the center of the turbine, so that the electricity is generated by directly driving the generator 2.

Figure 7:
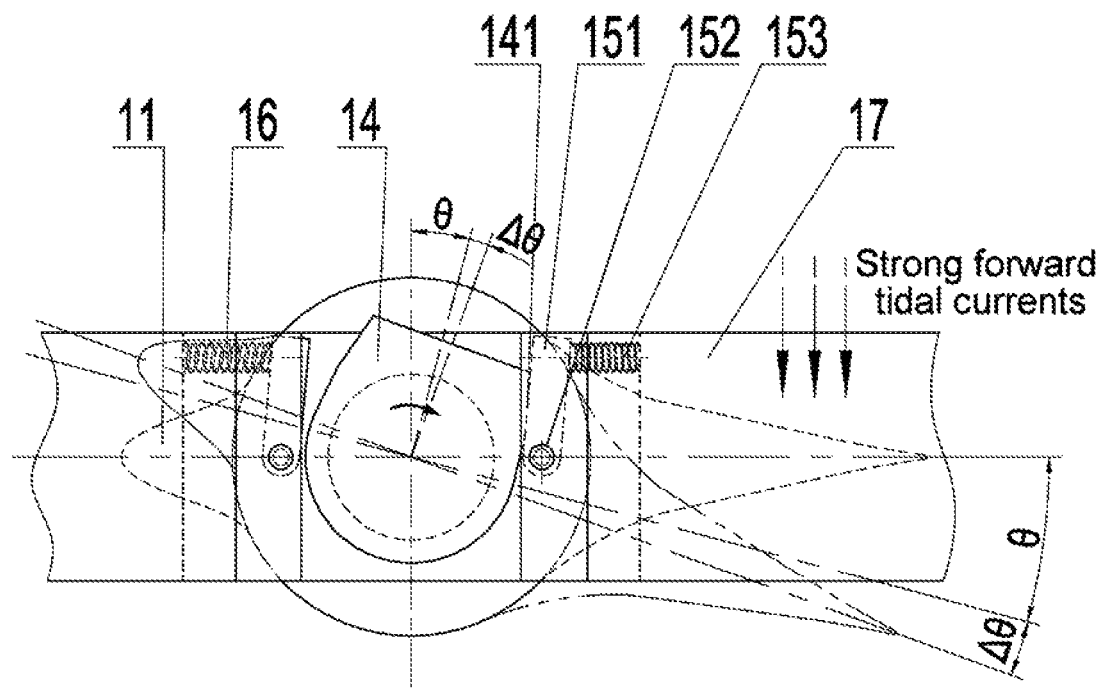
FIG. 7 is a schematic diagram showing the blade pitch is changed to limit the tidal current generating unit of the present invention under a strong forward stream.

As shown in FIG. 7, when the blade 11 is pushed by strong forward tidal currents, the pressure generated by the hydraulic torque increases, and the forward spring 153 is further compressed and becomes shorter; the forward baffle 151 continues to rotate clockwise around the forward pin 152; the blade 11, blade stem 12 and pitch limiter 14 continue to rotate clockwise around the flange central axis 114 of the blade; and the increased pressure is eventually balanced by the reaction force of the forward spring 153, and the pitch angle of the blade 11 continues to change and is eventually maintained at an angle of (θ+Δθ). The tidal energy captured by the turbine 1 rotates counterclockwise around the center of the turbine, so that the electricity is generated by directly driving the generator 2. The tidal energy increases exponentially as the forward tidal current increases, and the energy captured by the turbine 1 also increases exponentially when the pitch angle of the blade 11 is remained at θ, such that the generator is operated in an overload condition; at the same time, the pitch angle of the blade 11 increases automatically from θ to (θ+Δθ) and the energy captured by the turbine 1 is reduced accordingly, which limits the overload of the generator and ensures a safe and reliable operation.

Figure 8:
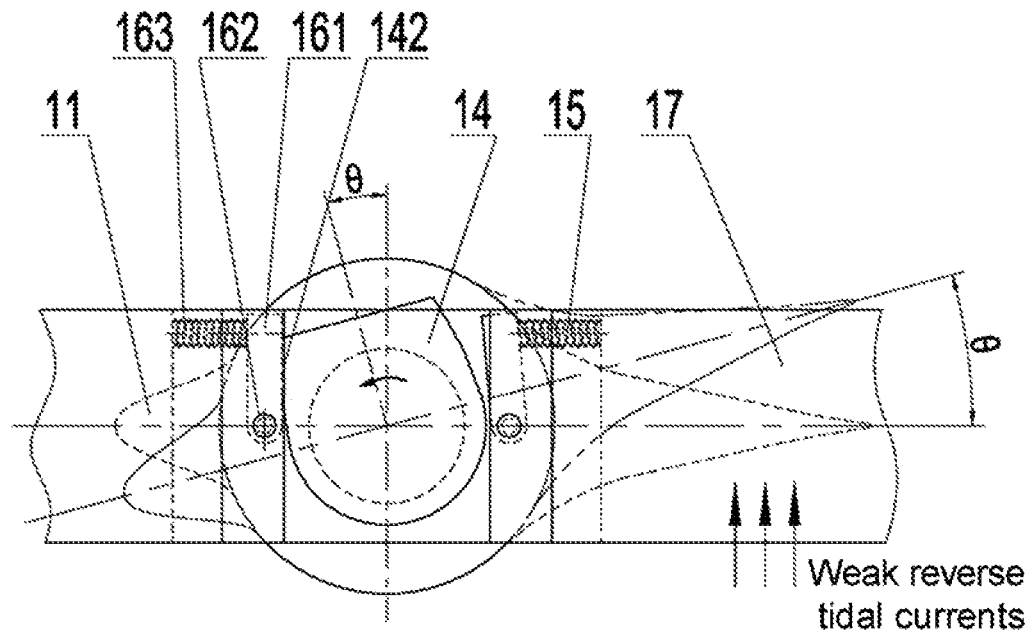
FIG. 8 is a schematic diagram showing the blade pitch is changed to limit the blade of the tidal current generating unit of the present invention under a weak reverse stream.

As shown in FIG. 8, the reverse pitch regulator 16 comprises a reverse baffle 161, a reverse spring 163, and a reverse pin 162. The side of one end of the reverse baffle 161 is connected to/abuts one end of the reverse spring 163 and the middle of the other end of the reverse baffle 161 is rotatably mounted to the hub 17 by the reverse pin 162, and the reverse baffle 161 is rotatable around the counter pin 162, and the other end of the reverse spring 163 is connected to/abuts the hub 17.

As shown in FIGS. 5 and 8, when the blade 11 is pushed by weak reverse tidal currents, the hydraulic torque obtained at the rear edge 112 of the blade corresponding to the flange central axis 114 is greater than the hydraulic torque obtained at the front edge 111 of the blade corresponding to the flange central axis 114 due to the backswept blade. The blade 11, blade stem 12 and pitch limiter 14 are counterclockwise rotatable around the flange central axis 114 of the blade; the second limiting edge 142 is in contact with the reverse baffle 161 so that a pressure is generated and transferred to the reverse spring 163, and the reverse spring 163 is compressed and shortened; the reverse baffle 161 is counterclockwise rotatable around the reverse pin 162; and the pressure is eventually balanced by the reaction force of the reverse spring 163 so that the pitch angle of the blade 11 is changed and maintained at a reverse angle θ. The tidal energy captured by the turbine 1 rotates counterclockwise around the center of the turbine, so that the electricity is directly generated by driving the generator 2.

Even though the angle θ is used to represent the forward angle θ which is the pitch angle of the blade 11 and the reverse angle θ which is the pitch angle of the blade 11, but the values of the θ may be different and varies according to the actions of the tidal currents. Similarly, the values of the forward angular rotation of θ+Δθ and the reverse angular rotation of θ+Δθ may also be different. The letters θ is only illustrative and does not necessarily represent an equal value, and the value of θ is determined by the material and structure of the components such as the forward pitch regulator 15, the reverse pitch regulator 16 and the hub 17, etc.

Figure 9:
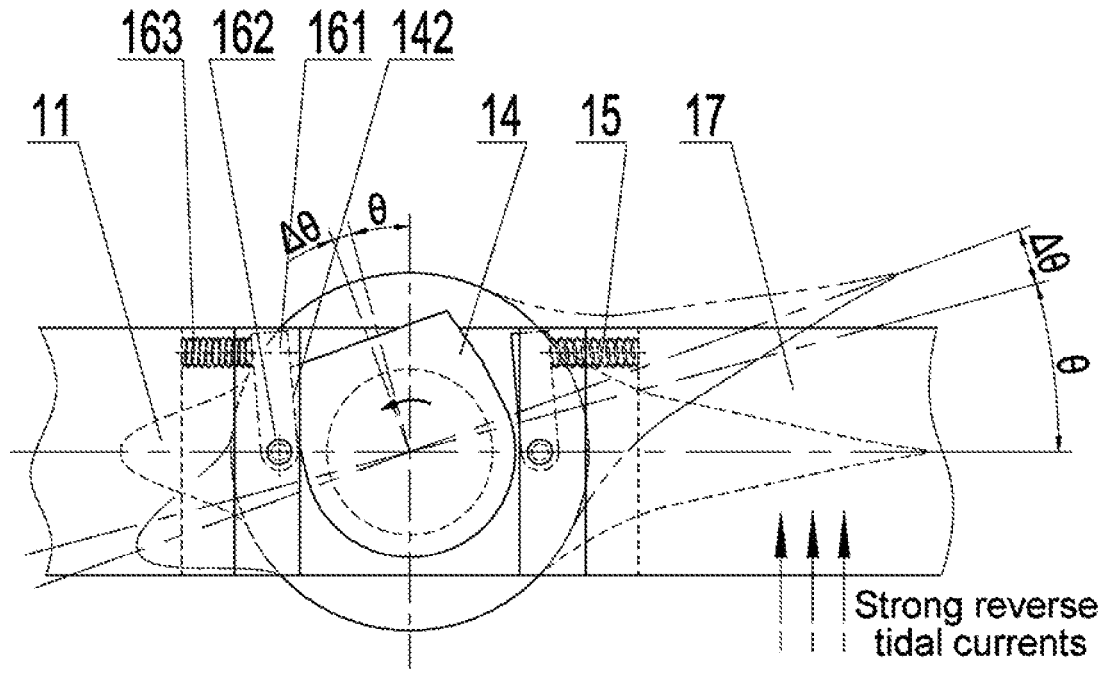
FIG. 9 is a schematic diagram showing the blade pitch is changed to limit the blade of the tidal current generating unit of the present invention under a strong reverse stream.

As shown in FIG. 9, when the blade 11 is pushed by strong reverse tidal currents, the pressure generated by the hydraulic torque increases, and the reverse spring 163 is further compressed and becomes shorter; the reverse baffle 151 continues to rotate counterclockwise around the reverse pin 162; the blade 11, blade stem 12 and pitch limiter 14 continue to rotate counterclockwise around the flange central axis 114 of the blade; and the increased pressure is eventually balanced by the reaction force of the reverse spring 163, and the pitch angle of the blade 11 continue to change and is eventually maintained at an angle of (θ+Δθ). The tidal energy captured by the turbine 1 rotates counterclockwise around the center of the turbine, and the electricity is directly generated by driving the generator 2. The tidal energy increases exponentially as the reverse tidal current increases, and the energy captured by the turbine 1 also increases exponentially when the pitch angle of the blade 11 is remained at θ, such that the generator is operated in an overload condition; at the same time, the pitch angle of the blade 11 is increased automatically from θ to (θ+Δθ) and the energy captured by the turbine 1 is reduced accordingly, which limits the overload of the generator and ensures a safe and reliable operation.

The adaptive mechanical structure of the turbine 1 of the above embodiment automatically adjusts the pitch, so the pitch angle of the blades is adjusted to limit the output power of the generator. The adaptive mechanical structure of the turbine 1 can be realized by the turbine comprising the blade stem, the blade stem bearing, the pitch limiter, the forward pitch regulator and the reverse pitch regulator, and it can also be realized by a deformable material or a designed mechanical structure that produces elastic deformations and recoveries from the deformation, so it is not limited herein.

As shown in FIG. 10, the generator 2 comprises the stator 21 and the rotor 22; the reverse thrust bearing 3 is mounted between a front end of central shaft 211 of the stator and the front bracket 221 of the rotor, and the forward thrust bearing 4 is mounted between a rear end of central shaft 211 of the stator and the rear bracket 222 of the rotor; an axial round hole is provided on the center of rear bracket 222 and mounted with a rear guide bearing 6; and sediment discharge holes 223 are provided on both ends of the rotor 22 to discharge the sediment outside the generator 2, which prevents the generator 2 from the damages caused by the sediment deposition.

As shown in FIG. 10, the generator 2 is of an open structure without a sealed compartment, and no sealing member is required. The electrical surfaces of the stator 21 and the rotor 22 each are covered with a sealing layer 23 to ensure the electrical protection of the generator 2. The seawater flows through the inside of the generator 2, so that the heat is taken away to achieve the cooling effect. The unit capacity of the tidal current generating unit in the prior art has been developed to the megawatt level, but due to the sealed generator room, the sealing structure and heat dissipation of the generators have been a technical problem. However, the present invention overcomes such technical problem.

As shown in FIG. 10, the outer ring of the reverse thrust bearing 3 is provided with a sediment control ring 31 to prevent sediment from entering the reverse thrust bearing 3; the outer ring of the forward thrust bearing 4 is provided with a sediment control ring 41 to prevent the sediment from entering the forward thrust bearing 4.

In summary, the tidal current generating unit of the embodiment of the present invention is a horizontally arranged two-way passive direct-drive horizontal axis tidal current generating unit with a self-variable pitch. The tidal current generating unit of the embodiment of the present invention automatically changes the pitch under the forward or reverse tidal currents without relying on an external force such as a hydraulic pressure or electricity, and the tidal energy of the forward or reverse tidal current is captured by the blade 11 of the turbine 1 and the electricity is directly generated by driving the generator 2; when the flow rate of the tidal currents is higher than designed value and the generator is overloaded, the output power of the generator is limited by the automatic adjustment of the pitch, such that a safe and reliable operation of the generator is guaranteed. The generator is of the open structure with no requirement for sealing, and the heat of the generator is directly taken away by the seawater flowing through the inside of the generator, which overcomes the problems of sealing and heat dissipation of the generator.

The above embodiment is only a preferred embodiment of the present invention, and is not intended to limit the scope of the present invention. The equivalent structural variations based on the present invention and the contents of the accompanying drawings, or the direct or indirect applied other related technical fields shall fall within the scope of the present invention.

We claim:

1. A tidal current generating unit, comprising: a turbine, a hub, a generator, a bearing set and a fixed flange;
   wherein the generator comprises a stator and a rotor;
   the turbine is connected to the rotor of the generator by the hub; the rotor is rotatably mounted on an outer circumference of the stator of the generator via the bearing set; the stator of the generator is fixedly connected to the fixed flange; a rotating component comprises the hub and the rotor; and the turbine drives the rotating component to rotate to generate electricity;
   the turbine comprises a blade, and a density of the blade is much smaller than a density of seawater, such that the blade has sufficient buoyancy that offsets gravity of the rotating component in the seawater, and a load of the bearing set is reduced;
   the turbine further comprises a blade stem, a blade stem bearing, a pitch limiter, a forward pitch regulator and a reverse pitch regulator; a root of the blade is fixedly connected to the blade stem; a blade stem hole is radially distributed on the hub, and the blade stem is rotatably mounted in the blade stem hole by the blade stem bearing and is rotatable around a flange central axis of the blade in the blade stem hole;
   the pitch limiter comprises a first limiting edge and a second limiting edge connecting with the first limiting edge, the first limiting edge and the second limiting edge are protruding, and surround a rear end of the blade stem;
   the forward pitch regulator is arranged at one side of the pitch limiter, and the reverse pitch regulator is oppositely arranged at another side of the pitch limiter;
   a rear end of the blade stem is coaxially connected to the pitch limiter; when the blade is pushed by forward tidal currents, the blade, blade stem and pitch limiter are clockwise rotated around the flange central axis of the blade; when the blade is pushed by reverse tidal currents, the blade, blade stem and pitch limiter are counterclockwise rotated around the flange central axis of the blade.

2. The tidal current generating unit of claim 1, wherein the blade is a backswept blade, and a hydrodynamic central axis of the blade is inclined from a flange central axis of the blade at a first angle; and the blade is hollow and is filled with a light filler inside.

3. The tidal current generating unit of claim 2, wherein when a flow rate of a tidal current is higher than a threshold value to cause an overload of the generator, a pitch is automatically adjusted by the turbine through a mechanical structure, such that the pitch angle of the blade is adjusted to limit output power of the generator.

4. The tidal current generating unit of claim 1, wherein the forward pitch regulator comprises a forward baffle, a forward spring and a forward pin; a side of one end of the forward baffle abuts one end of the forward spring; a middle of the other end of the forward baffle is rotatably mounted to the hub by the forward pin, and the forward baffle is rotatable around the forward pin; and the other end of the forward spring abuts the hub; and the reverse pitch regulator comprises a reverse baffle, a reverse spring and a reverse pin; a side of one end of the reverse baffle abuts one end of the reverse spring; a middle of the other end of the reverse baffle is rotatably mounted to the hub by the reverse pin, and the reverse baffle is rotatable around the reverse pin; and the other end of the reverse spring abuts the hub.

5. The tidal current generating unit of claim 4, wherein a fixed dome is fixed at a front of the stator, and a rotatable draft tube is provided on an outside of the rotor, and rotates with the turbine and the rotor;
- the bearing set comprises a reverse thrust bearing, a forward thrust bearing, a front guide bearing and a rear guide bearing; and
- the reverse thrust bearing is mounted between a front end of a central shaft of the stator and a front bracket of the rotor, and the forward thrust bearing is mounted between a rear end of the central shaft of the stator and a rear bracket; and an axial round hole is provided at a center of rear bracket and mounted with the rear guide bearing.

6. The tidal current generating unit of claim 5, wherein the axial round hole is provided on a center of the hub and mounted with the front guide bearing.

7. The tidal current generating unit of claim 6, wherein the generator is of an open structure without a sealed compartment; and a sealing layer is respectively provided on electrical surfaces of the stator and rotor.

8. The tidal current generating unit of claim 7, wherein an outer ring of the reverse thrust bearing is provided with a sediment control ring to prevent sediment from entering the reverse thrust bearing; and
- an outer ring of the forward thrust bearing is provided with another sediment control ring to prevent the sediment from entering the forward thrust bearing.

9. The tidal current generating unit of claim 8, wherein a sediment discharge hole is respectively provided on two opposite ends of an outer wall of the rotor, so that the sediment is discharged outside the generator under a centrifugal force when the rotor rotates.

* * * * *

UNITED STATES PATENT AND TRADEMARK OFFICE
CERTIFICATE OF CORRECTION

PATENT NO. : 11,028,820 B2
APPLICATION NO. : 16/688330
DATED : June 8, 2021
INVENTOR(S) : Changlu Liu Page 1 of 1

It is certified that error appears in the above-identified patent and that said Letters Patent is hereby corrected as shown below:

On the Title Page

Item (73) The full name of the Assignee should be:
HangZhou JiangHe Hydro-Electrical Science&Technology Co., Ltd. Hangzhou, CN Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*